G. FORNACA.
VEHICLE BRAKE MECHANISM.
APPLICATION FILED JUNE 7, 1913.
1,271,509.
Patented July 2, 1918.
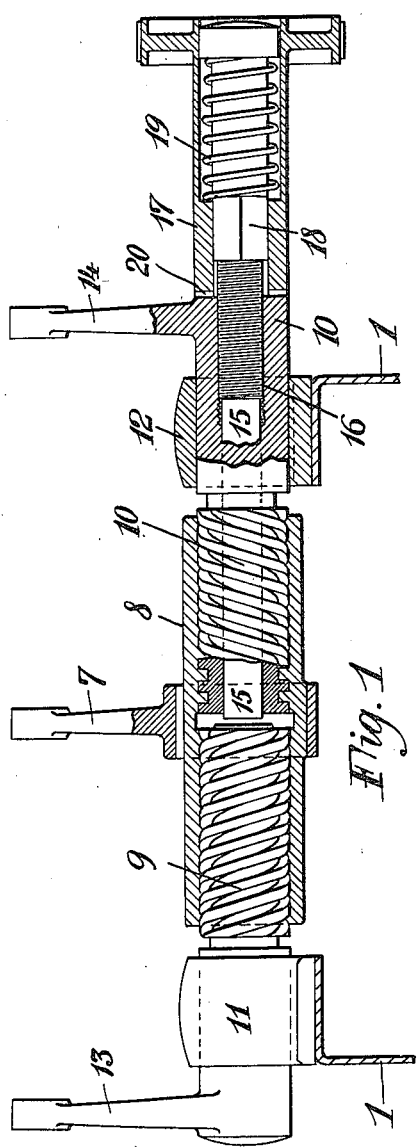
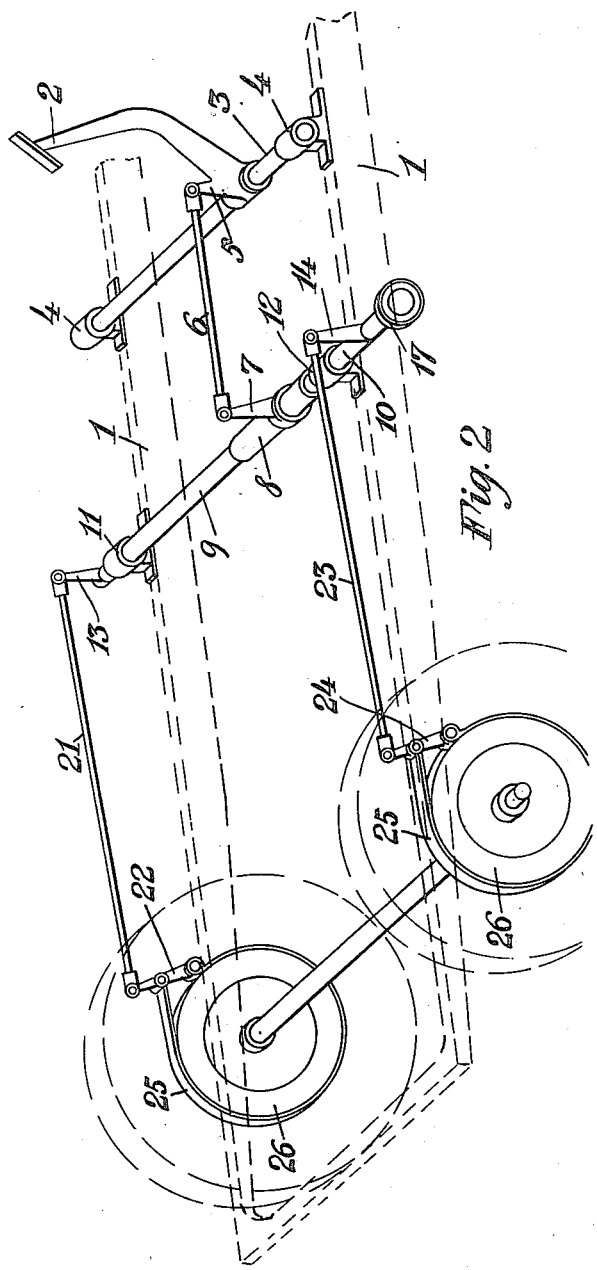
Witnesses:
Joseph D. Connolly
M. S. Love
Inventor
Guido Fornaca
By his Attorneys
Edwards, Sager & Wooster

UNITED STATES PATENT OFFICE.

GUIDO FORNACA, OF TURIN, ITALY, ASSIGNOR TO F. I. A. T., A CORPORATION OF ITALY.

VEHICLE BRAKE MECHANISM.

1,271,509.   Specification of Letters Patent.   Patented July 2, 1918.

Application filed June 7, 1913. Serial No. 772,256.

*To all whom it may concern:*

Be it known that I, GUIDO FORNACA, a subject of the King of Italy, residing at Turin, Province of Piedmont, Italy, have invented certain new and useful Improvements in Vehicle Brake Mechanism, of which the following is a full, clear, and exact specification.

This invention relates to vehicle brake mechanism and has particular reference to an equalizing differential brake mechanism wherein band or other brakes can be simultaneously applied to a plurality of drums with equal power.

An object of this invention is to do away with the use of equalizing levers and cables, or differential spur gears heretofore employed, by means of a nut and differential screws connected to the respective brakes whereby positive and quick application of the brakes may be effected, and also automatic equalization.

A further object of the invention is to provide a single means for taking up wear of the brakes which can be adjusted from the side of the vehicle to take up wear in one or more brakes without the necessity of separately adjusting each brake.

In the accompanying drawing,

Figure 1 is a longitudinal section of the improved differential equalizing mechanism; and Fig. 2 is a perspective diagrammatic view of the mechanism applied to a vehicle.

1, 1 are longitudinal frame members, 2 a brake applying lever, herein shown as a foot lever, but which can be a hand or power operated lever, if desired, carried by a rock shaft 3 which is journaled in bearings 4 mounted on the side frames 1. 5 is a lever secured to shaft 3, connected by link 6 to a lever 7 carried by a nut 8. The nut 8 is oppositely threaded (preferably interiorly) to engage correspondingly threaded oppositely extending shafts 9, 10, which are supported in bearings 11, 12, respectively, carried by the frame 1. At the ends of these respective shafts 9, 10, are levers 13, 14 connected by links 21, 23 to brake operating levers 22, 24 which contract brake bands 25 on drums 26. Instead of band brakes, any other well known form of brake can be operated by this mechanism. Suitable springs will be used according to well known practice to restore the parts to normal position, such springs not forming a part of this invention.

The shaft 10 is hollow, and is provided with a rod 15 adapted to project beyond the inner end thereof and having threaded engagement at 16 with the hollow portion of rod 10. The rod 15 is squared as at 18, so as to engage an adjusting handle 17, which handle can slide relatively to rod 15 but can turn rod 15 so as to screw it more or less into shaft 10. The handle 17 is provided at its inner end with clutch teeth 20 to engage corresponding teeth formed on the outer end of shaft 10, a spring 19 between the threaded end of rod 15 and the handle 17 being provided for the purpose of holding the handle 17 engaged with shaft 10 to prevent accidental rotation. It will be seen that the rod 15 constitutes in effect means for varying the length of one of the differential shafts, as 10, and as hereinafter explained also effects the necessary taking up of the brake bands so as to secure equal application.

The motion of the operating lever 2 is communicated through lever 5, link 6 and lever 7 to nut 8, which latter upon being turned causes the ends of shafts 9, 10 to be drawn toward each other until their ends come in contact (depending upon the adjustment of rod 15) and assuming that the shafts 9 and 10 will be momentarily stationary. As soon as the ends of the differential shafts 9, 10 come in contact, they both turn together to apply the brake, but when one band contracts on the drum it tends to cause its differential shaft 9 or 10 to become stationary, further rotation of the nut therefore simply causing the stationary shaft to push the other shaft out of the nut, thereby turning the other shaft and the attached brake operating lever as 14 or 13 to apply the other brake. As soon as both brakes are equally applied by this differential self equalizing motion, both shafts 9 and 10 become locked to the nut and the power will be applied equally to both brakes.

To take up the wear on the brake bands, the handle 17 is disengaged from the clutch and rotated so as to screw the rod 15 more or less into the shaft 10. As the rod 15 bears at one end on the projecting end of shaft 9, turning the rod 15 compels the ends of shafts 9 and 10 to move away from each other on account of the inclination of the screw threads on shafts 9 and 10. These two shafts are thus compelled to rotate through equal angles in the same direction relatively to the nut 8, consequently altering the angle between the lever 7 and levers 13, 14. The latter being connected by the links 21, 23 and brake contracting levers 22, 24, cause the same angular alteration to be made by levers 22, 24 and thereby adjusting the brake straps. This is equivalent to varying the length of links 21, 23, but it will be seen that a simple turning of the handle 17 at one side of the machine effects the desired adjustment of both brakes.

The clutch teeth 20 on handle 17, together with the spring 19, constitute a safety lock which not only permit the rod 15 to be adjusted by hand in a more convenient manner than previous brake adjustments, but prevent accidental loosening through vibration or other causes. The threads 16 for additional safety are made sufficiently fine so that the rod 15 would not unscrew of itself when pushed longitudinally, even should the clutch teeth become disengaged, but the spring 19 provides a positive lock by reason of the squared portion 18 of rod 15.

The single differential adjusting means for both brakes, located at one side of the chassis between the wheels, renders brake adjustment much simpler and more accessible, than with prior devices where each brake is separately adjusted at the wheel. Moreover, excessive lost motion is avoided.

It will be understood that the mechanism herein described is by way of example only, and that the invention is not limited to the precise details and arrangements illustrated in the drawings.

Having thus described my invention, I declare that what I claim as new and desire to secure by Letters Patent, is:—

1. The combination in a vehicle having a plurality of wheels, of a plurality of brakes, a single operating means, and screw and nut equalizing means between said brakes and said operating means.

2. The combination in a vehicle having a plurality of wheels, of a plurality of brakes, an actuating rock shaft for each brake, a single operating means, and a screw and nut equalizing connection between said operating means and said rock shafts.

3. The combination in a vehicle having a plurality of wheels, of a plurality of brakes, a transverse rock shaft for actuating each brake, and an actuating means having threaded connection with both of said shafts.

4. The combination in a vehicle having a plurality of wheels, of a plurality of brakes, an actuating shaft for each brake, and an actuating means between and having oppositely threaded connection with both of said shafts.

5. The combination with a vehicle frame having a plurality of wheels, of a brake for each wheel, a shaft connected to simultaneously actuate said brakes, and a single means located at one side of the frame for simultaneously adjusting said brakes.

6. The combination with a vehicle frame having a pair of wheels, of a brake for each wheel, a transverse shaft for controlling said brakes, and means carried at one end of said shaft for simultaneously adjusting said brakes.

7. The combination with a vehicle frame having a pair of wheels, of a brake for each wheel, and a single actuating means for said brakes comprising a screw and nut equalizing mechanism maintaining equal pressures on all of said brakes.

8. The combination in a vehicle having a plurality of wheels, of a plurality of brakes, a transverse actuating rock shaft for each brake, an actuating means between and having screw connection with both shafts, and means for adjusting the slack.

9. The combination with a plurality of brakes, of an actuating shaft for each brake, an actuating means having connection with both shafts, and means comprising an adjustable abutment carried by one of said shafts for adjusting the slack.

10. The combination with a plurality of brakes, of an actuating shaft for each brake, an actuating means having connection with both shafts, and means comprising a longitudinally movable abutment carried by one of said shafts for adjusting the slack.

11. The combination in a vehicle having a plurality of wheels, of a plurality of brakes, an actuating rock shaft for each brake, a common means between and screw connected to each shaft to simultaneously move said brakes, said means simultaneously moving said shafts longitudinally and effecting relative rotation of one of said shafts to equalize the braking force when one brake contacts with its wheel first.

12. The combination with a plurality of brakes, of an actuating shaft for each brake, an actuating means having screw connection with both shafts, a rod movable longitudinally of one of said shafts adapted to engage the other shaft, and a releasable connection for locking said rod to said first shaft.

13. The combination with a plurality of brakes, of an actuating shaft for each brake, an actuating means having screw connection with both shafts, a rod threaded to one of said shafts adapted to engage the other shaft, an operating handle for turning said rod, and means for locking said rod to said first mentioned shaft.

14. The combination with a plurality of brakes, of an actuating shaft for each brake, an actuating means having screw connection with both shafts, a rod threaded to one of said shafts adapted to engage the other shaft, an operating handle for turning said rod, and means for locking said rod to said first mentioned shaft, said handle being movable longitudinally of said rod and having releasable clutch connection with said first shaft.

15. The combination with a plurality of brakes, of an actuating shaft for each brake, an actuating means having screw connection with both shafts, a rod threaded to one of said shafts adapted to engage the other shaft, an operating handle for turning said rod, and means for locking said rod to said first mentioned shaft, and a spring for maintaining said handle in locked position.

16. The combination in a chassis having wheels, of a brake mechanism for said wheels, operating means transversely journaled on the chassis comprising alined screw connected rock shafts, and means at one side of said chassis for relatively adjusting said shafts to vary the slack of said brakes.

17. The combination in a chassis having wheels, of a brake mechanism for said wheels, operating means journaled on the chassis, means at one side of said chassis for simultaneously adjusting the slack of said brakes, and means normally locking said adjusting means.

18. The combination with a plurality of brakes, of an actuating shaft for each brake, an actuating means having opposite screw connection with both shafts, a rod threaded to one of said shafts at a lower pitch than that of said screw connections, said rod being adjustably engaged with the other shaft, and means for releasably locking said rod to its shaft.

19. In combination with separate power transmitting lever arms for a plurality of load receiving devices, a common power-applying lever arm, means connecting said power transmitting arms and relatively movable horizontally with respect to the arms and operable to equalize the strain between the same and cause them to move in unison, said transmitting and power-applying arms all having a common axis and being movable in vertical planes.

20. In combination with an operating arm for each of a plurality of brakes, a rotatable common member connected with said arms, said member and arms being provided with engaging screw threads to permit movement of the arms relatively to the member longitudinally thereof, means operable to limit said movement and lock said arms and member together and means to rotate said member.

21. In combination with oscillating arms for separately operating a plurality of brakes, a common operating member connected with said arms, means to limit rotative adjustment of said arms relatively to said operating member, and means to effect such adjustment to change the throw of the arms.

In testimony whereof I affix my signature, in presence of two witnesses.

GUIDO FORNACA.

Witnesses:
C. S. FEYLES,
A. CHIOTTO.